United States Patent
Seema

(10) Patent No.: US 9,715,585 B2
(45) Date of Patent: Jul. 25, 2017

(54) OPTICAL AUTHENTICATION OF OPERATIONS FOR A MOBILE DEVICE

(71) Applicant: Freescale Semiconductor, Inc., Austin, TX (US)

(72) Inventor: Adolph Seema, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/508,007

(22) Filed: Oct. 7, 2014

(65) Prior Publication Data
US 2016/0098551 A1  Apr. 7, 2016

(51) Int. Cl.
*H04L 29/06* (2006.01)
*G06F 17/30* (2006.01)
*G06F 15/16* (2006.01)
*G06F 7/04* (2006.01)
*G06F 21/36* (2013.01)

(52) U.S. Cl.
CPC ..................... *G06F 21/36* (2013.01)

(58) Field of Classification Search
CPC .......... G06F 21/36; H04L 63/02; H04L 63/20
USPC .......................................................... 726/7
See application file for complete search history.

(56) References Cited

U.S. PATENT DOCUMENTS

| | | |
|---|---|---|
| 7,065,645 B2 | 6/2006 | Teicher |
| 8,176,332 B2 | 5/2012 | Drake |
| 2004/0143737 A1* | 7/2004 | Teicher ............. G07C 9/00015 713/167 |
| 2008/0250481 A1* | 10/2008 | Beck ..................... H04L 63/083 726/6 |
| 2010/0095371 A1* | 4/2010 | Rubin ...................... H04L 9/32 726/18 |
| 2011/0026716 A1* | 2/2011 | Tang ....................... G06F 21/43 380/284 |
| 2012/0304269 A1* | 11/2012 | Rodriguez ............ G06F 3/0488 726/7 |
| 2013/0015946 A1* | 1/2013 | Lau ........................ G07C 9/00 340/5.2 |
| 2013/0198519 A1* | 8/2013 | Marien ................... G06F 21/34 713/172 |
| 2014/0059666 A1* | 2/2014 | Zheng ..................... H04L 63/08 726/9 |
| 2014/0189359 A1* | 7/2014 | Marien ................. H04L 9/3234 713/172 |

OTHER PUBLICATIONS

Lawrence O'Gorman,; Secure Identification Documents via Pattern Recognition and Public-Key Cryptography; IEEE; vol. 20, No. 10, Oct. 1998 p. 1-6.*

* cited by examiner

*Primary Examiner* — Monjour Rahim

(57) ABSTRACT

An operation at a mobile device is authenticated by using a random visual presentation displayed at the device for the authentication. The mobile device generates and displays the random visual presentation which is optically captured (e.g., by a camera) at a capturing device. The capturing device uses the captured random visual presentation to generate an authentication value (e.g., a hash) based on a defined security protocol. The authentication value is compared to an expected value and if the values match the mobile device executes the operation.

12 Claims, 5 Drawing Sheets

OPTICAL AUTHENTICATION OF OPERATIONS FOR A MOBILE DEVICE

BACKGROUND

Field of the Disclosure

The present disclosure relates generally to mobile devices and more particularly to authentication of operations at mobile devices.

Description of the Related Art

Mobile devices, such as compute-enabled cell phones, are increasingly used to facilitate sensitive operations, including financial operations, storage and transfer of personal information, and the like. To provide security for such operations, a mobile device can implement an authentication procedure, wherein it will not execute a secure operation until an authentication value is verified. For some mobile devices, the initial pairing parameters for authentication are generated by a biometric device based on biometric information (e.g., a fingerprint) of a user. Other mobile devices employ a near field communication (NFC) chip to transfer the authentication parameters (or sensitive information) to or from another device placed in close proximity. However, both biometric and NFC security procedures require a mobile device that has been outfitted with additional hardware increasing the expense and complexity of the device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate techniques for authenticating an operation at a mobile device using a random visual presentation (e.g., a certified true random visual presentation, a pseudo-random visual presentation, and the like) displayed at the mobile device. The mobile device generates and displays the random visual presentation which is optically captured (e.g., by a camera) at a capturing device. The capturing device uses the captured random visual presentation to generate an authentication value (e.g., a hash) based on a defined security protocol. The authentication value is compared to an expected value and, if the values match, the mobile device executes the operation. Because the authentication value is based on a random visual presentation (such as a certified true random visual presentation), the pairing process is more secure than one based on a fixed value such as a password, barcode, or fingerprint. In addition, because the initial random visual presentation is transferred via optical capture, it is less susceptible to interception than a value transmitted wirelessly. Moreover, the authentication process does not require additional hardware such as an NFC chip or biometric module, simplifying authentication.

Figure 1:
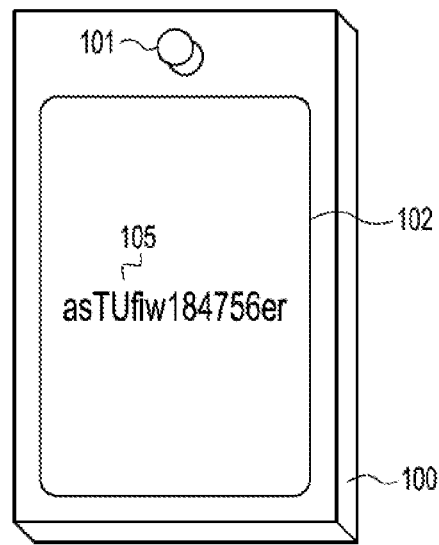
FIG. 1 is a diagram of a mobile device displaying a random visual presentation for optical capture in accordance with at least one embodiment of the present disclosure.

FIG. 1 illustrates a mobile device 100 in accordance with at least one embodiment of the present disclosure. The mobile device 100 can be any electronic portable device such as a cell phone, personal data assistant, portable game console, and the like. The mobile device 100 includes an image capture device 101 and a display 102. The image capture device 101 is a device, such as a digital camera, generally configured to capture and record an image. For purposes of description, the image capture device 101 will be referred to as camera 101. The display 102 can be any kind of mobile display capable of displaying information, such as a light emitting diode (LED) display, liquid crystal display (LCD), and the like.

The mobile device 100 includes a processor (not shown at FIG. 1) to execute one or more stored computer programs (e.g., an operating system, one or more applications or "apps", and the like). In the course of executing the computer programs, the mobile device 100 is requested to perform operations that require authentication before the operation can be executed. These operations are referred to herein as "secured operations." Examples of secured operations include initiating execution of a secure section of program code, communication of private information, decryption of encrypted data, and the like. To illustrate via an example, the mobile device 100 can execute an application to conduct a financial transaction with a point-of-sale terminal. In the course of executing the application, the mobile device 100 can receive a request from the point-of-sale terminal to transmit private financial information, such as a stored credit card number. In response, the mobile device 100 determines that transmission of the private financial information is a secure or trusted operation.

In response to receiving a request to execute a secure operation, the mobile device 100 generates and displays a random visual presentation 105. As used herein, a random visual presentation is defined as being either of a random number, random string of alphanumeric characters, a random visual pattern, or any combination thereof (e.g., barcodes and QR codes representing random numbers/strings). The random visual presentation can be generated based on a true random number process or a pseudo-random number process. Thus, for example, the random visual presentation can be a true random number generated based on environmental or other physical data (e.g., radio noise, thermal measurements, clock drift, shot noise, diode avalanche noise, and the like), or can be a pseudo-random number, such as a cryptographically secure random number.

The mobile device 100 displays the random visual presentation 105 at the display 102. As described further herein, the random visual presentation 105 is displayed so that it can be optically captured by an image capturing device (e.g. a camera) at another device, referred to herein as the "capturing device". The capturing device generates an authentication value (e.g., a hash) based on the security protocol being used to authenticate the secure operation and provides the authentication value to the mobile device 100. In at least one embodiment, the capturing device provides the authentication value via wireless transmission, such as via a wireless network, Bluetooth interface, near field communication interface, and the like. In another embodiment, the capturing device displays the authentication value and the mobile device 100 uses the camera 101 to capture an image of the authentication value. The mobile device 100 compares the authentication value to an expected value as defined by the security protocol and, if the values match, it executes the secure operation. If the authentication value does not match the expected value, the mobile device 100 declines to execute the secure operation, thereby protecting the secure operation from unauthorized access.

Figure 2:
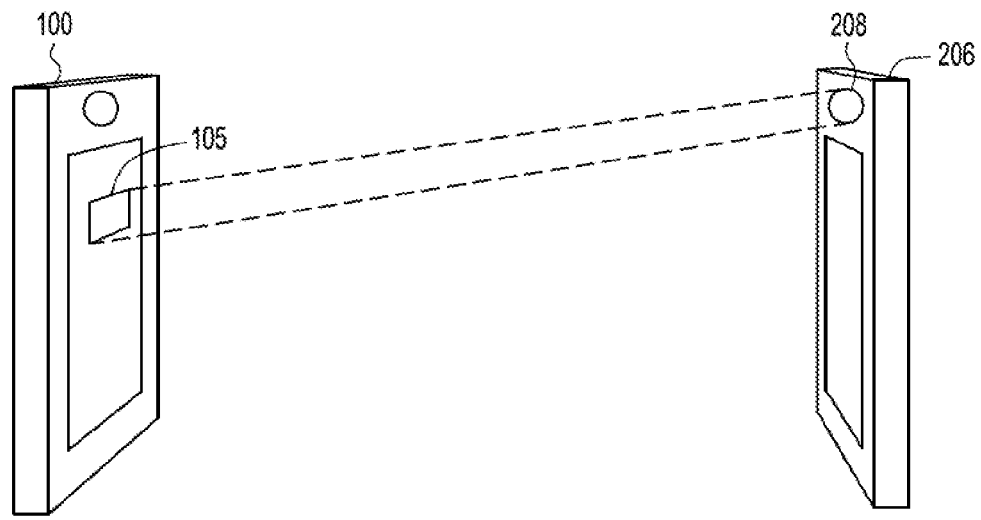
FIG. 2 is a diagram illustrating optical capture of the random visual presentation displayed at the mobile device of FIG. 1 for an authentication procedure in accordance with at least one embodiment of the present disclosure.

FIG. 2 illustrates optical capture of the random visual presentation displayed at the mobile device 100 for an authentication procedure in accordance with at least one embodiment of the present disclosure. In addition to the mobile device 100, FIG. 2 depicts a capturing device 206. In the illustrated example, the capturing device is another mobile device (e.g., a compute-enabled phone), but in other embodiments the capturing device 206 can be a desktop or laptop computer, tablet, cash register or other point-of-sale terminal, electronic kiosk, an automated industrial robot and the like. The capturing device 206 includes an image capturing device 208 (e.g., a camera).

In operation, the mobile device 100 receives a request to execute a secure operation. The request can be received via a user input, via a request communicated (e.g., via wireless interface) by the capturing device 206, automatically in response to the mobile device moving within a specified proximity of the capturing device 206, and the like. In response to the request, the mobile device 100 displays the random visual presentation 105. The capturing device 206 uses the image capturing device 208 to optically capture (e.g., take a picture) and image of the random visual presentation 105. The capturing device 206 extracts the random visual presentation 105 from the captured image, and generates an authentication value based on the random visual presentation 105. In at least one embodiment, the capturing device 206 then communicates the authentication value to the mobile device 100, which compares the authentication value to an expected value. If the values match, the mobile device 100 executes the requested secure operation. If the values do not match, the mobile device 100 does not execute the requested secure operation.

To illustrate via an example, in at least one embodiment a user of the mobile device 100 desires to transfer confidential information (e.g., financial information, pictures, or personal information) to the capturing device 206. Accordingly, the user initiates an application at the mobile device 100 to transfer the information. The mobile device 100 identifies that the application's request to transfer the information is a secure operation. The identification can be made based on any of a variety of criteria, including based on the memory address where the information is stored, an identifier embedded in the application's request, and the like. In response to identifying the request for the secure operation, the mobile device 100 generates and displays the random visual presentation 105. The capturing device 206 employs the image capturing device 208 to optically capture an image of the random visual presentation 105. The capturing device 206 extracts the random visual presentation 105 from the captured image and generates a hash based on the random visual presentation 105. In at least one embodiment, capturing device 206 displays the generated hash, which the mobile device 100 optically captures using the camera 101. The mobile device 100 identifies an expected value for authentication. In at least one embodiment, the mobile device 100 generates the expected value by generating a hash based on the random visual presentation 105, using the same process as that employed by the capturing device 206. The mobile device compares the expected value to the hash value from the capturing device 206 and, if the values match, initiates transfer of the confidential information to the capturing device 206. In at least one embodiment, the capturing device 206 employs the transferred confidential information to process a financial transaction, such as applying a charge to a credit card to complete a purchase, to transfer funds from one financial account to another, and the like.

In some embodiments, the capturing device 206 can generate the hash for authentication based on information in addition to the random visual presentation 105. For example, in at least one embodiment the capturing device 206 measures the distance between it and the mobile device 100 when it captures the image of the random visual presentation 105. The capturing device 206 employs the measured distance in its generation of the hash, providing further variability (and therefore further security) in the hash.

As illustrated by the above example, authentication of a secure operation is based on the random visual presentation 105 that is displayed at the mobile device 100 for optical capture by the capturing device 206, thereby providing enhanced security. In particular, because the random visual presentation 105 is a random one, it cannot be easily stolen or spoofed, in contrast to a fixed value, such as fixed password or bar code. Further, because the random visual presentation is transferred to the capturing device via optical capture of an image, it is less susceptible to unauthorized copying during transmission than a value transferred via, for example, a wireless or other computer network. Further, the random visual presentation 105 can be optically captured using a camera or other relatively common image capturing device, obviating the need for special hardware such as biometric sensors, NFC hardware, and the like.

Figure 3:
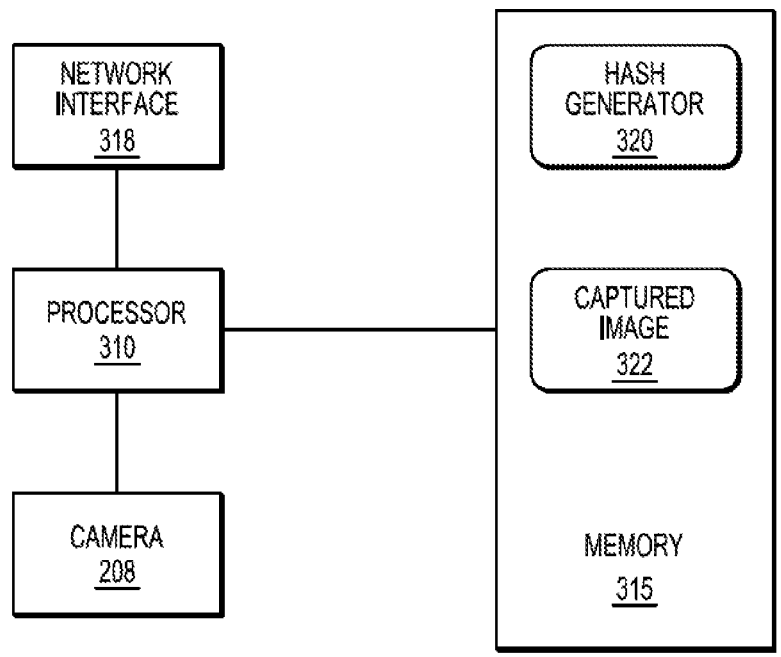
FIG. 3 is a block diagram of the capturing device of FIG. 2 in accordance with at least one embodiment of the present disclosure.

FIG. 3 illustrates a block diagram of an electronic system of the capturing device 206 in accordance with at least one embodiment. The capturing device 206 includes an image capturing device (indicated in the depicted example as a camera) 208, a processor 310, a memory 315, and a network interface 318. The processor 310 is a general purpose or application specific processor configured to execute sets of instructions (e.g., computer programs). In operation, the processor 310 receives a request to authenticate a secure operation at the mobile device 100. In response, the processor 310 issues a command to the camera 208 to optically capture an image, and the processor 310 stores the resulting captured image 322, or compressed or otherwise altered representation thereof, at the memory 315.

The processor 310 then extracts the random visual presentation 105 from the captured image 322. In at least one embodiment, the processor 310 employs one or more optical character recognition (OCR) techniques, such as matrix matching, feature extraction, and the like, to extract the random visual presentation. The processor 310 then executes a hash generator 320 to generate a hash based on the random visual presentation 105. In at least one embodiment, the hash generator 320 uses additional information to generate the hash, such as the distance between the capturing device 206 and the mobile device 100 when the captured image 322 is captured.

The processor 310 provides the generated hash to another device for authentication. In at least one embodiment, the processor 310 communicates the generated hash to the mobile device 100 for authentication via a wireless or wired network connected to the network interface 318. In another embodiment, the processor 310 communicates the hash to a remote server via the network interface 318. The remote server receives the random visual presentation 105 from the mobile device 100, generates an expected value based on the random visual presentation 105, and compares the expected value to the hash. If the values match, the remote server sends an indication to the mobile device 100 that the secure operation can be executed. If the values do not match, the remote server sends an indication to the mobile device 100 to prevent execution of the secure operation.

Figure 4:
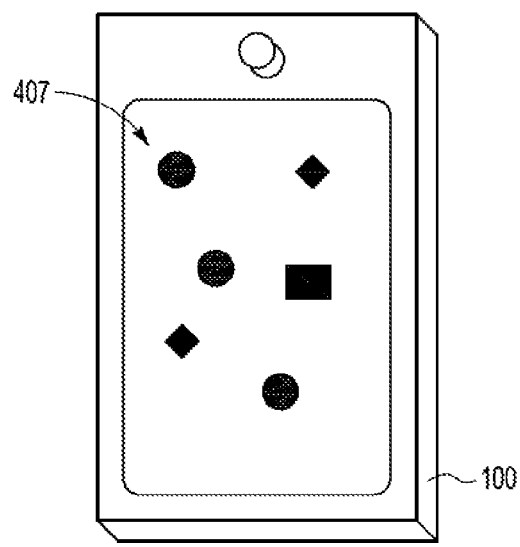
FIG. 4 is a diagram illustrating the mobile device of FIG. 1 displaying a random visual presentation in the form of a visual pattern in accordance with at least one embodiment of the present disclosure.

In some embodiments, the random visual presentation 105 is not a number nor an alphanumeric string, but is a random visual pattern. An example is illustrated at FIG. 4, which depicts the mobile device 100 displaying a random visual pattern 407. The randomness of the random visual pattern 407 can be incorporated in any of a number of ways. Thus, for example, the particular shapes in the random visual pattern 407 can be random, the orientation and distance between the shapes can be based on random numbers, or a combination thereof. The processor 310 (FIG. 3) can extract a random number from the random visual pattern 407 by identifying which shapes are displayed, identifying the orientation of the shapes, and the distance between the shapes, and combining the information, according to a specified security protocol, to calculate the random number. The processor 310 can then execute the hash generator to generate the hash based on the calculated random number. The use of a random visual pattern can provide enhanced security in certain scenarios by providing a random visual presentation that is not easily spoofed by conventional session paring attack methods.

Figure 5:
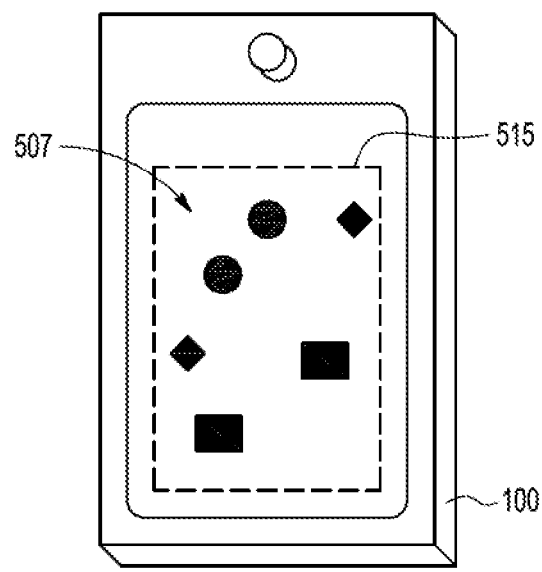
FIG. 5 is a diagram illustrating the mobile device of FIG. 1 displaying a random visual presentation at a portion of the device's display in accordance with at least one embodiment of the present disclosure.

In some embodiments, the processor 310 may generate the hash based on both a random visual presentation and a size of an enclosure that contains the random visual presentation. An example is illustrated at FIG. 5, which depicts the mobile device 100 displaying a random pattern 507 within an enclosure 515 in accordance with at least one embodiment. The dimensions of the enclosure 515 can be random, or can be defined by the security protocol used by the capturing device 206 to generate the hash. In operation, the processor 310 identifies one or more aspects of the enclosure 515, such as the area, the perimeter, or a combination thereof, and employs the identified aspects, together with the random pattern 507, to generate the hash for authentication. The enclosure 515 thus provides another aspect of variability or secrecy, thereby further enhancing the security of the hash.

Figure 6:
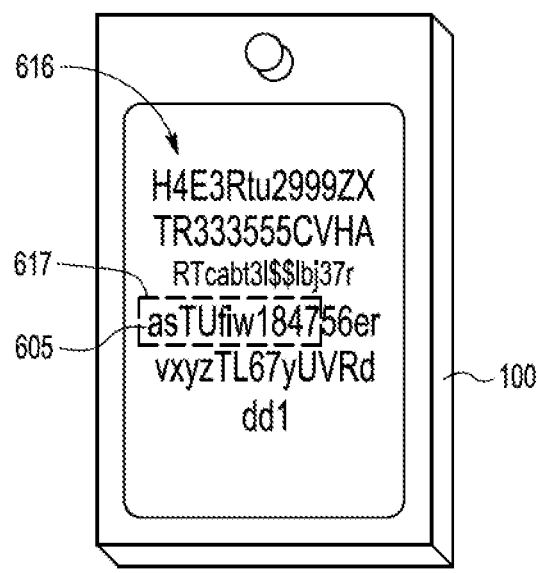
FIG. 6 is a diagram illustrating the mobile device of FIG. 1 displaying a random visual presentation embedded in a larger string of values in accordance with at least one embodiment of the present disclosure.

In some embodiments, the mobile device 100 displays the random visual presentation 105 embedded in a longer string of characters or in a larger visual pattern. An example is illustrated at FIG. 6, which depicts the mobile device 100 displaying a random visual presentation 605 in a region 617 of an alphanumeric string 616. In at least one embodiment, the dimensions and location of the region 617 is defined by the security protocol employed by the capturing device 206 to generate the hash. In operation, the processor 310 (FIG. 2) employs the camera 208 to capture the entire alphanumeric string 616 in the captured image 322. The processor 310 then identifies, based on the defined security protocol, the region 617, and employs OCR techniques to extract the random visual presentation 605 from the region 617. In another embodiment, rather than capture the entire alphanumeric string 616, the processor 310 controls the camera 208 to capture an image of only the region 617, and identifies the random visual presentation 605 based on the image of the region. Because random visual presentation 605 is embedded within the larger alphanumeric string 616, it is more difficult for an observer to derive the random visual presentation 605, thus enhancing security.

Figure 7:
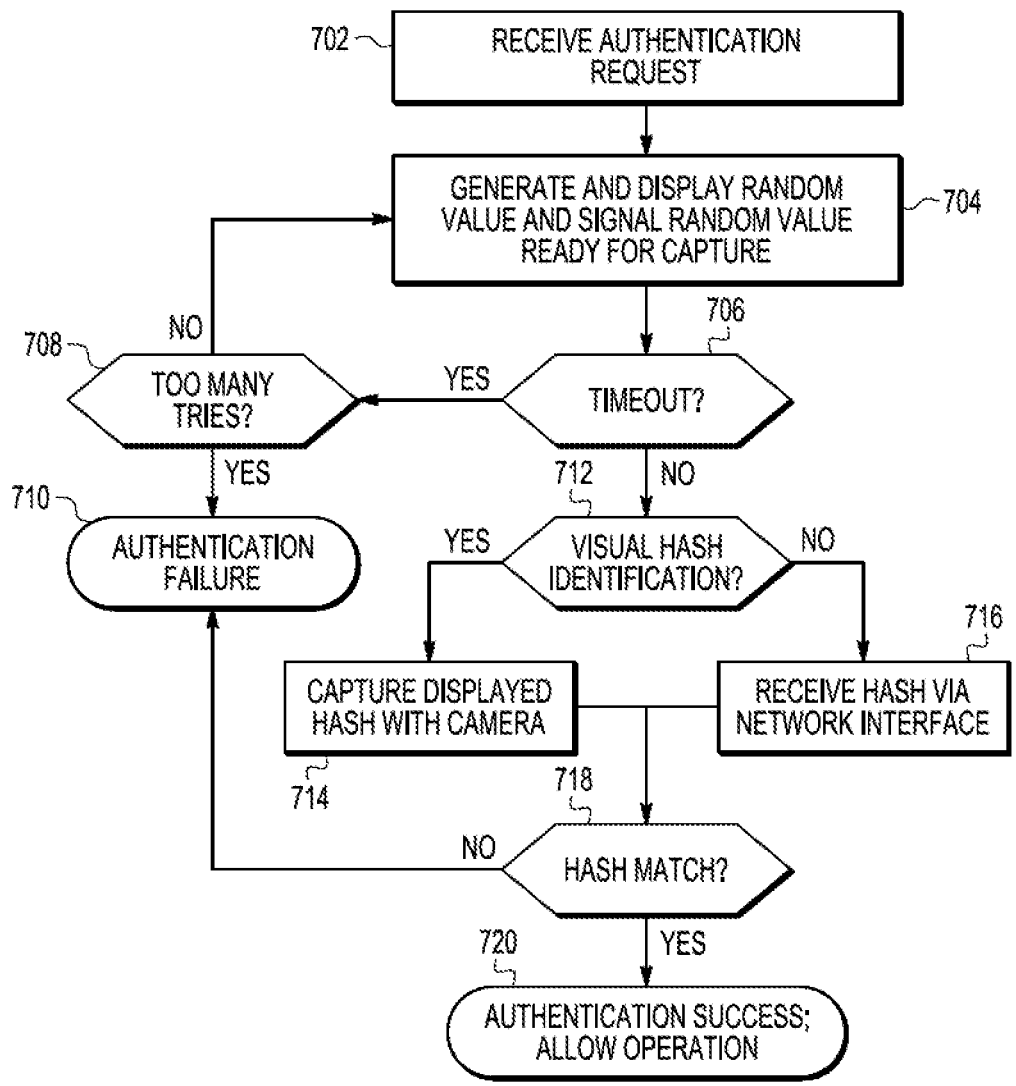
FIG. 7 is a flow diagram of a method of generating a random visual presentation at a mobile device to authenticate an operation at the device in accordance with at least one embodiment of the present disclosure.

FIG. 7 illustrates a flow diagram of a method 700 of authenticating a secure operation at the mobile device 100 in accordance with at least one embodiment. At block 702 the mobile device 100 receives a request to authenticate a secure operation. In response, at block 704 the mobile device 100 generates and displays the random visual presentation 105 and signals the capturing device 206 that the random visual presentation is ready for capture. The signal triggers initiation of a timer (not shown) at the mobile device 100.

At block 706 the mobile device 100 determines whether the timer is still counting down towards expiration or whether the timer has expired, resulting in a timeout. When the timer expires, the method flow moves to block 708 and the mobile device 100 determines whether it has displayed, in response to the authentication request at 702, a threshold number of random visual presentations. If not, the method returns to block 704 and the mobile device 100 generates a new random visual presentation for authentication. If, at block 708, the mobile device 100 determines that it has displayed the threshold number of random visual presentations, the method flow proceeds to block 710 and the mobile device 100 determines that authentication has failed. In response, the mobile device 100 prevents execution of the secure operation.

Returning to block 706, if the mobile device 100 determines that the timer has not expired, the method flow proceeds to block 712 and the mobile device 100 determines whether visual hash identification is enabled by the security authentication protocol employed by the capturing device 206. If so, the method flow proceeds to block 714 and the mobile device 100 uses the camera 101 to capture the hash displayed by the capturing device 206. If, at block 712, visual hash identification is not enabled, the method flow moves to block 716 and the mobile device 100 receives the hash via a network interface (e.g., a wireless network interface).

The method flow proceeds from each of blocks 714 and 716 to block 718, where the mobile device 100 compares the received hash to an expected value it has calculated based on the random visual presentation 105. If the hash value does not match the expected value, the method flow moves to block 710 and the mobile device 100 identifies an authentication failure and does not execute the secure operation. If the hash value matches the expected value, the method flow moves to block 720 and the mobile device 100 identifies an authentication success. In response, the mobile device 100 executes the secure operation. In at least one embodiment, before executing the secure operation the mobile device 100 conducts additional security operations, such as requesting a user password.

Figure 8:
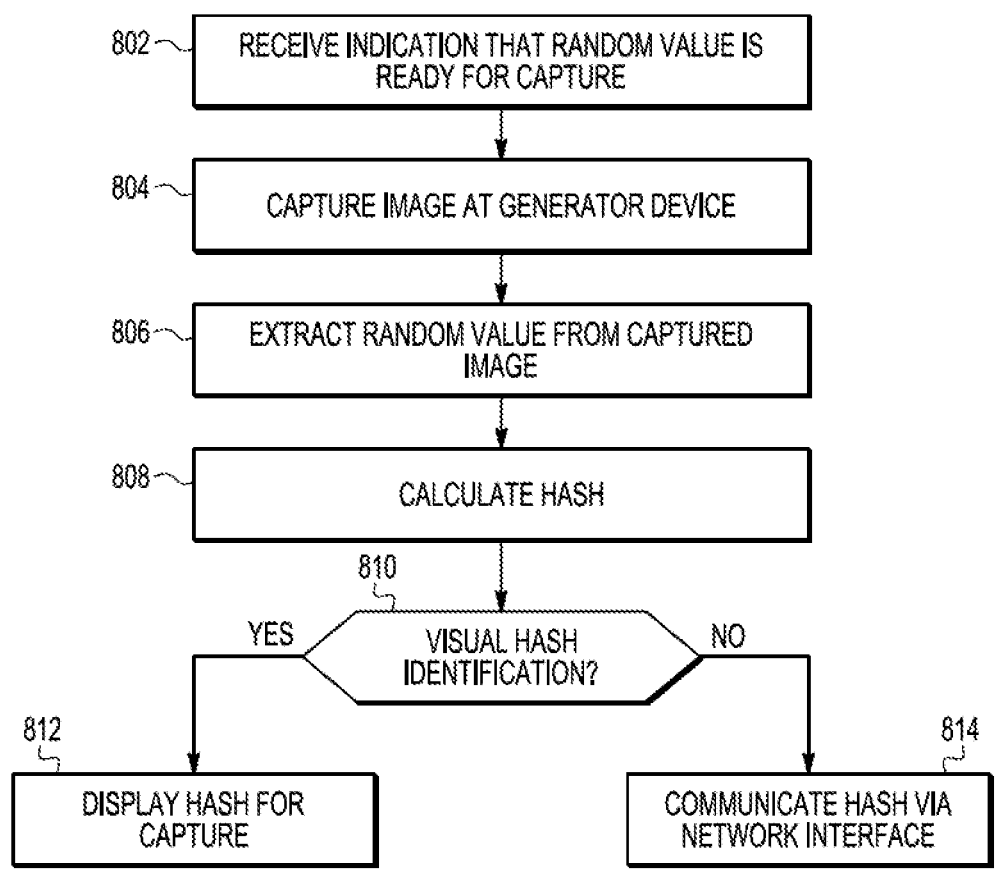
FIG. 8 is a flow diagram of a method of capturing a random visual presentation to generate an authentication value to authenticate an operation at a mobile device in accordance with at least one embodiment of the present disclosure.

FIG. 8 illustrates a flow diagram of a method 800 of capturing a random visual presentation at the capturing device 206 to authenticate an operation at the mobile device 100 in accordance with at least one embodiment of the present disclosure. At block 802 the capturing device 206 receives an indication from the mobile device 100 that the random visual presentation 105 is ready for optical capture. In response, at block 804 the capturing device 206 uses the camera 208 to capture the random visual presentation displayed at the mobile device 100. At block 806 the processor 310 extracts the random visual presentation 105 from the captured image 322. The technique of extraction can depend on the type of the random visual presentation 105. If the random visual presentation 105 is a random number, the number can be extracted using optical character recognition or other pattern recognition techniques. If the random visual presentation 105 is a random visual pattern, in at least one embodiment the pattern is extracted by performing edge detection or other detection algorithm to identify a set of shapes incorporated in the captured image, wherein the position of each shape is random. The position of each shape is identified, and a random number generated based on the position of each shape.

At block 808 the processor 310 uses the hash generator 320 to generate a hash based on the extracted value 105. At block 810 the processor 310 determines whether visual hash identification is enabled. If so, the method flow moves to block 812 and the processor 310 displays the hash for optical capture by the mobile device 100. If visual hash identification is not enabled, the method flow moves to block 814 and the processor 310 communicates the hash to the mobile device 100 via the network interface 318.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   capturing, with an image capture device of a computing device, an image of a random non-numerical visual pattern displayed by a mobile device;
   generating, based on the random non-numerical visual pattern, an authentication value at the computing device to authenticate a subsequent operation by the mobile device;
   displaying at the computer device a hash value for image capture at the mobile device, the mobile device to authenticate an operation at the mobile device based on the hash value matching the authentication value.

2. The method of claim 1, wherein generating the authentication value comprises:
   determining the authentication value based on the random non-numerical visual pattern and a distance between the image capture device and the mobile device.

3. The method of claim 1, wherein generating the authentication value comprises:
   determining the authentication value based on a location of the random non-numerical visual pattern within a scan region expected of the computing device.

4. The method of claim 1, wherein generating the authentication value comprises:
   identifying a portion of the image that includes the random non-numerical visual pattern;
   extracting the random non-numerical visual pattern from the image based on the identified portion; and
   determining the authentication value based on the extracted random non-numerical visual pattern.

5. The method of claim 1, further comprising:
   communicating the authentication value to a remote server; and
   receiving an indication from the remote server that the operation has been authenticated based on the authentication value.

6. The method of claim 1, wherein the operation comprises a financial transaction.

7. A method, comprising:
   receiving, at a mobile device, a request to authenticate an operation;
   in response to the request, generating at the mobile device a random authentication value to authenticate the operation;
   displaying at the mobile device a non-numerical visual pattern representing the random authentication value, the non-numerical visual pattern for capture by an image capture device of a computing device;
   capturing at the mobile device of a hash value displayed by the computing device, the hash value based on the authentication value;
   authenticating an operation at the mobile device based on a comparison of the hash value and the authentication value.

8. The method of claim 7, wherein displaying the non-numerical visual pattern comprises displaying the visual presentation as a portion of a larger image.

9. A device, comprising:
   an image capture device configured to capture an image of a random non-numerical visual pattern displayed at a mobile device; and
   a processor configured to:
      generate an authentication value based on the random non-numerical visual pattern to authenticate an operation at the mobile device; and
      display a hash value for image capture at the mobile device, the mobile device to authenticate an operation at the mobile device based on the hash value matching the authentication value.

10. The device of claim 9, wherein the processor is to generate the authentication value by:
   determining the authentication value based on the random non-numerical visual pattern and a distance between the image capture device and the mobile device.

11. The device of claim 9, wherein the processor is to generate the authentication value by:
   determining the authentication value based on the random non-numerical visual pattern and dimensions of an enclosure of the image.

12. The device of claim 9, wherein the processor is to generate the authentication value by:
   identifying a portion of the image that includes the random non-numerical visual pattern;
   extracting the random non-numerical visual pattern from the image based on the identified portion; and
   generating the authentication value based on the extracted random non-numerical visual pattern.

* * * * *